US009208258B2

(12) United States Patent
Spillane et al.

(10) Patent No.: US 9,208,258 B2
(45) Date of Patent: Dec. 8, 2015

(54) LOCKING AND TRAVERSAL METHODS FOR ORDERED TREE DATA STRUCTURES

(71) Applicant: Apple Inc., Cupertino, CA (US)

(72) Inventors: Richard P. Spillane, Mountain View, CA (US); Wenguang Wang, Santa Clara, CA (US); David A. Majnemer, Great Neck, NY (US)

(73) Assignee: Apple Inc., Cupertino, CA (US)

( * ) Notice: Subject to any disclaimer, the term of this patent is extended or adjusted under 35 U.S.C. 154(b) by 308 days.

(21) Appl. No.: 13/861,329

(22) Filed: Apr. 11, 2013

(65) Prior Publication Data

US 2014/0310317 A1    Oct. 16, 2014

(51) Int. Cl.
G06F 17/30    (2006.01)

(52) U.S. Cl.
CPC .... *G06F 17/30961* (2013.01); *G06F 17/30091* (2013.01)

(58) Field of Classification Search
CPC .................................................. G06F 17/30091
See application file for complete search history.

(56) References Cited

U.S. PATENT DOCUMENTS

| | | | |
|---|---|---|---|
| 4,945,475 A | 7/1990 | Bruffey et al. | |
| 5,089,952 A | 2/1992 | Bozman | |
| 5,446,858 A | 8/1995 | Copeland et al. | |
| 5,682,537 A | 10/1997 | Davies et al. | |
| 7,174,331 B1 | 2/2007 | Luo et al. | |
| 7,577,658 B2 | 8/2009 | Graefe | |
| 8,219,587 B2 | 7/2012 | Odaira | |
| 2005/0102255 A1 | 5/2005 | Bultman | |
| 2006/0282481 A1 | 12/2006 | Zhou et al. | |
| 2008/0154840 A1 | 6/2008 | Rathi et al. | |
| 2010/0082664 A1 | 4/2010 | Odaira | |
| 2013/0031298 A1 | 1/2013 | Tan et al. | |
| 2013/0185271 A1 | 7/2013 | Strain et al. | |
| 2014/0074841 A1 * | 3/2014 | Majnemer et al. | 707/737 |

OTHER PUBLICATIONS

CogNiTioN, Newbie: Intro to cron Dec. 30, 1999, unixgeeks.org, http://www.unixgeeks.org/security/newbie/unix/cron-1.html.*
Dell Latitude D600 2003, Dell Inc, 2 pages.*
William E. Weihl and Paul Wang, "Multi-Version Memory: Software Management for Concurrent B-Trees," Proceedings of the Second IEEE Symposium on Parallel and Distributed Processing, Dec. 9-13, 1990, Dallas, TX, pp. 650-655, Dec. 9, 1990.
R.Bayer et al., "Organization and Maintenance of Large Ordered Indexes", 1972, pp. 173-189, vol. 1, Fasc. 3, Acta Informatica.

(Continued)

*Primary Examiner* — Jason Liao
(74) *Attorney, Agent, or Firm* — Blakely, Sokoloff, Taylor & Zafman LLP

(57) ABSTRACT

In one embodiment, two-phase mutation of an ordered tree data structure is performed, wherein a lock can be acquired on a first node in an ordered tree data structure, and an identifier for the first node can be added to a lock path data structure. A second node can also be locked, and an identifier for the second node can be added to the lock path data structure. Subsequently, a set of operations to perform on the ordered tree responsive to a modification of the second node can be determined for each node affected by the modification, and the operation for each node can be stored in the lock path data structure. Once the operations for the nodes have been determined, the operations listed in the lock path can be performed.

33 Claims, 9 Drawing Sheets

(56) References Cited

OTHER PUBLICATIONS

Ibrahim Jaluta, "Concurrency control and recovery for balanced B-link trees", Sep. 14, 2004, pp. 257-277, Spinger-Verlag.

Douglas Comer, "The Ubiquitous B-Tree", Jun. 1979, pp. 121-137, vol. 11, No. 2, Computing Surveys.

Developer Connection, "Technical Note TN1150", retrieved from the Internet: http://dubeiko.com/development/FileSystems/HFSPLUS/tn1150.html, 65 pages, Apr. 10, 2013.

Donald E. Knuth, The Art of Computer Programming vol. 3 2nd ed. (Sorting and Searching); at § 6.2.4; "Multiway Trees"; pp. 481-491 (1998).

* cited by examiner

LOCKING AND TRAVERSAL METHODS FOR ORDERED TREE DATA STRUCTURES

BACKGROUND OF THE DISCLOSURE

In a computer system, information is typically stored on a non-volatile storage device, such as a hard disk drive or solid-state disk, and cataloged in some hierarchical fashion so that the same information is more easily retrieved when desired. A unique code name, such as a file's name, is attributed to a particular body of data to differentiate it from others, and the desired body of data is retrievable via the use of the appropriate code name associated with that data. The device can search for that code name and retrieve the desired data when that code name is found. Typically, code names associated with particular data contain pointers, which point to areas in memory reserved for mass storage. The various code names and their pointers comprise a cataloging system used to order the data on the mass storage device. In the case of particularly high-density storage devices, multiple trillions of bytes of information can be stored on such devices.

One tool used to manage a complex hierarchical file system is an ordered tree data structure, such as a B-tree data structure. The B-tree data structure is well-known in the prior art and is described in *The Art of Computer Programming Volume* 3 2nd ed. (Sorting and Searching); by Donald E. Knuth; at §6.2.4; titled "Multiway Trees"; pp. 481-491 (1998). The nodes of a B-tree contain records; each record is comprised of certain information, such as metadata for data stored in a hierarchical file system. Each record also has a key associated with that record. In some B-tree variants, records are stored in leaf nodes of the tree, and keys are stored in index nodes.

Enabling multiple concurrent accesses to a B-tree file system structure can present particular problems. Early B-tree concurrency techniques focused on allowing concurrent access to the tree from multiple users, processes or threads without corrupting data within the tree. Additional techniques arose to avoid broken tree states that can result in a file-system malfunction. For example, if concurrent access is not properly managed, two or more threads can enter a deadlock state, where each thread is blocked from execution while waiting for a resource held by another blocked threaded. While simple concurrent access methods can provide stable storage for file system metadata, that stability comes largely as a result of serializing access to file system structures.

SUMMARY OF THE DESCRIPTION

File system structures can store information in tree data structures as ordered n-tuples (e.g., pairs, triple, etc.) comprising a sequence of information indexed by a key. In one embodiment, information to represent various data for a hierarchical file system, such as catalog information, file attributes, file data or attribute extension information, lock ranges, etc. can be stored the nodes of an ordered tree data structure. To access information in the nodes, an embodiment of a method of traversal and modification can include locking a first node in the ordered tree data structure, and adding an identifier for the node to a lock path data structure, to record a traversal path through the tree data structure. In one embodiment, pointers and indexes for each node on the path are stored from a previous traversal to the desired node, and can be used to access the nodes on the path to the desired external node.

Once a lock has been acquired on the first node, an identifier for the first node can be added to a lock path data structure, to record each node along a traversal path. A second node can also be locked, and an identifier for the second node can also be added to the lock path data structure. In one embodiment, an identifier for the second node is read from the lock path data structure before the second node is locked. If information in the second node is to be modified, the modifications can require modifications to the tree, responsive to the modification of the second node. A set of operations to perform on the ordered tree can be determined for each node affected by the modification, and the operation for each node can be stored in the lock path data structure. Once the operations for the nodes have been determined, the operations listed in the lock path can be performed.

The modification process can also make use of functionality such as Shared locking, which is a feature of prioritized lock arbitration. The modification process can also make use of a Lock Path data structure, in which information on each locked node is recorded. The Lock Path data structure can also be used to record tree operations on each node to be recorded and analyzed before they are performed.

The above summary does not include an exhaustive list of all aspects of the various embodiments. It is contemplated that the various embodiments include all systems and methods that can be practiced from all suitable combinations of the various aspects summarized above, and also those disclosed in the Detailed Description below.

BRIEF DESCRIPTION OF THE DRAWINGS

The various embodiments are illustrated by way of example and not limitation. In the figures of the accompanying drawings, like references indicate similar elements.

DETAILED DESCRIPTION

Various embodiments and aspects of the ordered tree locking and traversal will be described with reference to details discussed below, and the accompanying figures will illustrate the various embodiments. Numerous specific details are described to provide a thorough understanding of various embodiments. However, in certain instances, well-known or conventional details are not described in order to provide a concise discussion of the various embodiments. While the following description and drawings are illustrative, they are not to be construed as limiting.

Determining the outcome of a tree modification before performing the modification can enable intelligent locking and traversal methods that enhance the overall performance of a file system B-tree during concurrent accesses by multiple threads. Such methods include Prioritized Lock Arbitration, Fast Path tree traversal and Two-Phase Mutation, and are illustrated by figures and tables as included or described below. The figures and logic that follow depict processing logic that includes hardware (e.g., circuitry, or dedicated logic), software as embodied in non-transitory computer readable media, or a combination of both hardware and software. Although some processes are described below in terms of sequential operations, it should be appreciated that some of the operations described may be performed in a different order. Moreover, some operations may be performed in parallel rather than sequentially. As well, embodiments of one operation described may be performed concurrently with an embodiment of a different operation on the same, or a different file system tree data structure. Additionally, a system, device, or apparatus can implement various embodiments of the methods described individually, or in combination with one or more other techniques described below.

Figure 1:
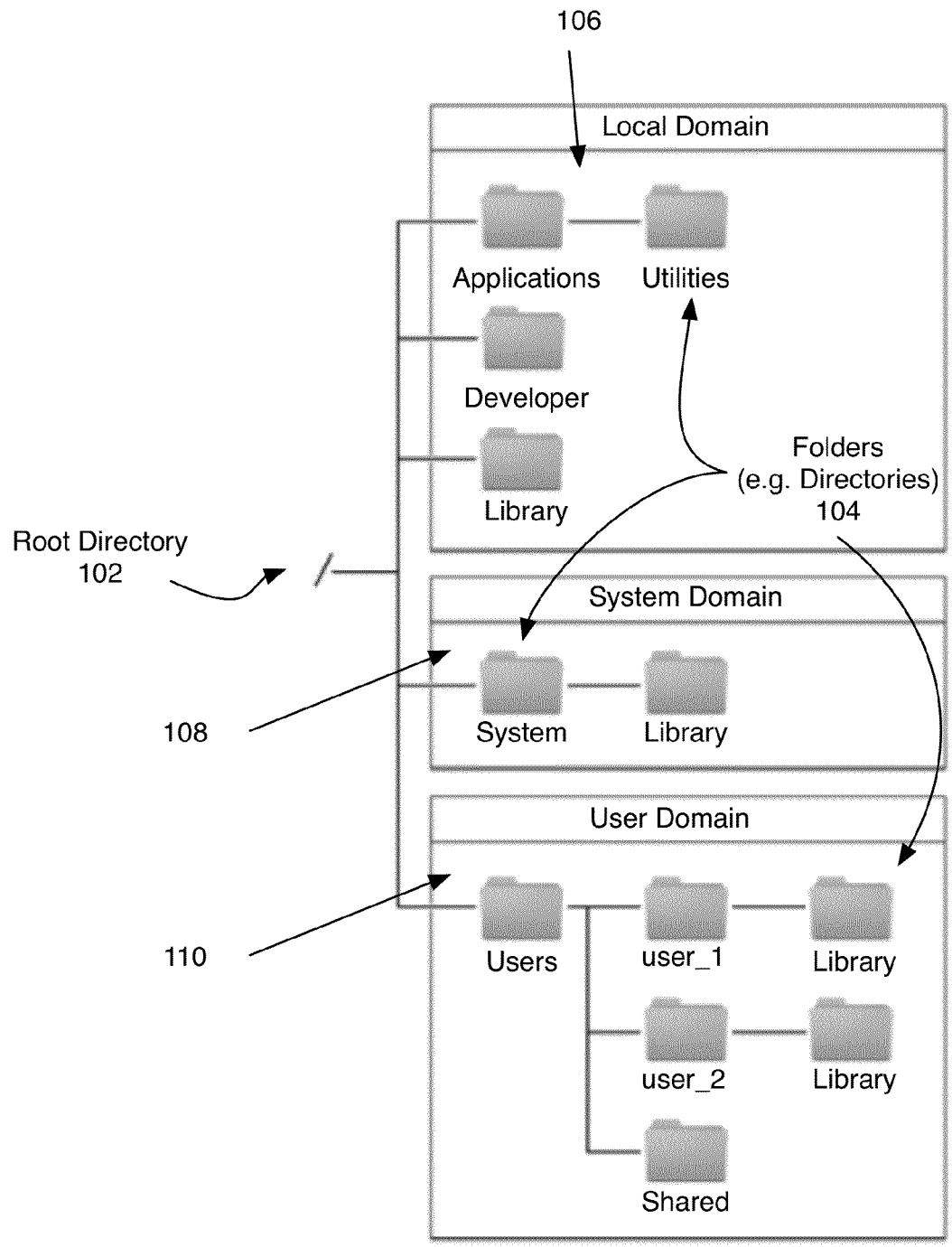
FIG. 1 is an illustration of an Example Hierarchical Filing System that provides a catalog of the data stored in various locations within a data storage device, according to an embodiment.

FIG. 1 is an illustration of an Example Hierarchical Filing System 100 that provides a catalog of the data stored in various locations within a data storage device, according to an embodiment. The file system uses a cataloging data structure, which can be illustrated as an upside-down tree type structure, topped by a starting directory, which operates as a root directory 102. Numerous other directories 104 (e.g. folders) and files emanate as offspring from the root directory, and a plurality of descendant levels branch downward to provide the hierarchical structure of the filing system. The file system can also be divided into multiple domains, which serve to separate files and resources based on their intended usage. A local domain 106 can contain resources such as applications that are local to the current data processing system and are shared among all users of that system. A system domain 108 can contain the system software, which includes the core operating system files that are required by the system to run. A user domain 110 can contain resources specific to the users of the data processing system, and generally contains the primary set of folders and files that the users of the data processing system can access and control.

To manage metadata for a file system, such as the Example Hierarchical Filing System 100, methods of ordered tree locking and traversal are described which allow concurrent access to ordered tree data structures during a significant majority of tree operations. References in the specification to "one embodiment" or "an embodiment" means that a particular feature, structure, or characteristic described in conjunction with the embodiment can be included in at least one embodiment, although references do not necessarily all refer to the same embodiment.

Figure 2:
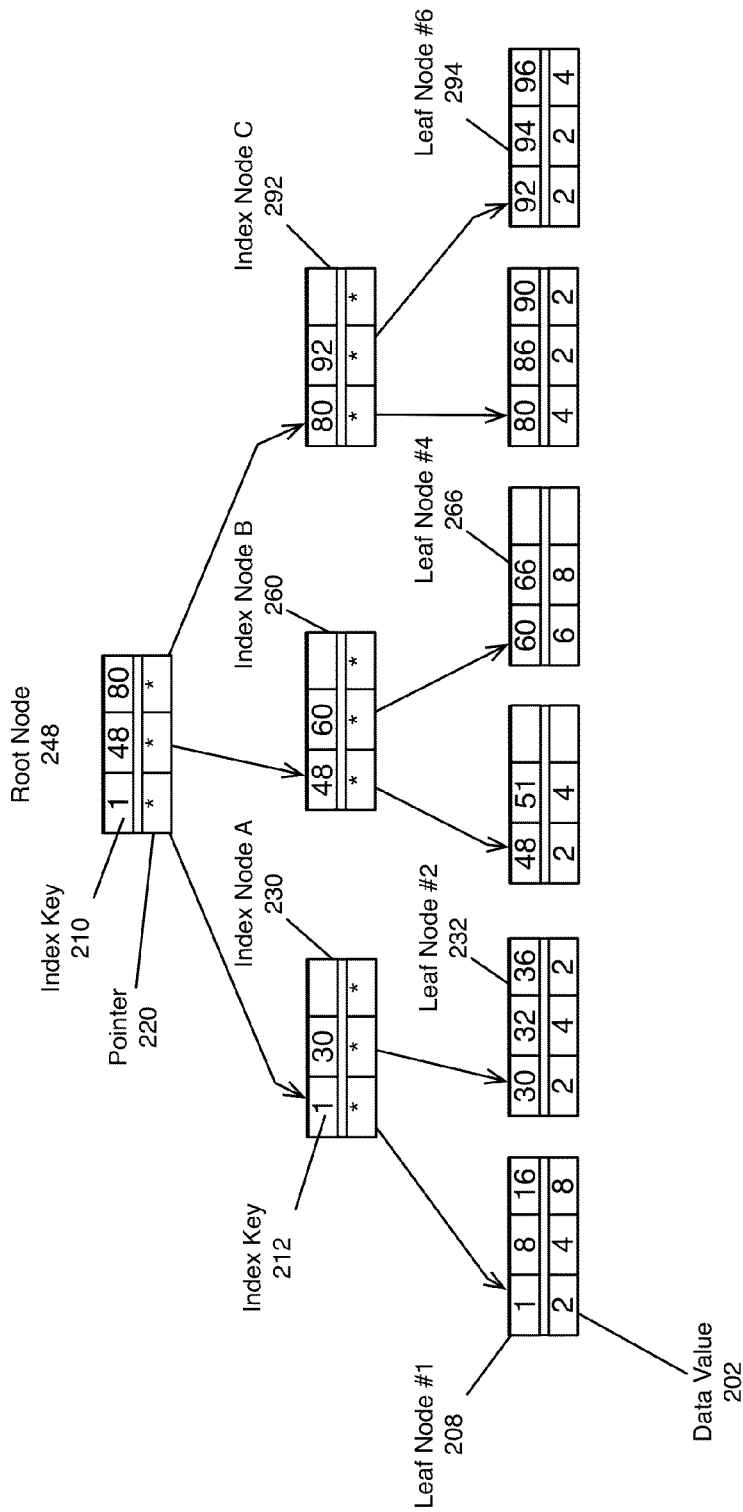
FIG. 2 is an exemplary variant of the B-tree data structure that is used to describe and illustrate embodiments of the methods.

FIG. 2 is exemplary variant of the B-tree data structure that is used to describe and illustrate embodiments of the methods. In the Exemplary File System Metadata Tree 200, nodes are either internal nodes (e.g., Index Node A 230, Index Node B 260, and Index Node C 292) or external nodes (e.g., Leaf Node #1 208, Leaf Node #2 232, Leaf Node #4 266, and Leaf Node #6 294). In a B-tree as generally known in the art, the tree is arranged such that each internal node contains at most N keys and N+1 pointers. Keys less than key #X lie in the sub-tree pointed to by pointer #X, and keys greater than key #X lie in the sub-tree pointed to by pointer #X+1. However, in the Exemplary File System Metadata Tree 200, there are no keys less than the first key (e.g., the zero index key, or MinKey) of a node. Accordingly, each internal node contains the same number of keys and pointers (at most N keys and N pointers), and each internal node has a pointer to the MinKey of its child node. For example, an Index Key 210 at index zero of Root Node 248 has pointer 220 to the index node (e.g., Index Node A 230) with an Index Key 212 matching the Index Key 210 in the parent node. Ultimately, the MinKey stored in each external and internal node is indexed and referenced by its parent node.

Information in the exemplary tree data structure can be stored as an ordered n-tuple (e.g., a pair, a triple, etc.) comprising a sequence of information indexed by a key. Information (e.g., data value 202) can be stored in the external nodes of the ordered tree to represent various data for a file system, such as catalog information, file attributes, file data or attribute extension information, lock ranges, etc. A catalog tree can be used to maintain information about the hierarchy of files and folders on a storage volume. An attributes tree can contain additional attribute information for files in the file system, such as access control lists for enhanced security. An additional B-tree can be used to record overflow allocations or attributes beyond that which is recorded in the catalog or attributes tree. Additionally, various embodiments of the file system B-trees can use either fixed length, or variable length keys to sort and index tuple data. For a basic discussion of the general use of B-trees in a hierarchical file system, see Hierarchical File System To Provide Cataloging And Retrieval Of Data, U.S. Pat. No. 4,945,475, which is hereby incorporated by reference.

In the Exemplary File System Metadata Tree 200, as in B-trees as are known in the art, reading data from an external node is non-destructive, and multiple threads can read concurrently. However, insert or delete actions at an external node can result in modifications to internal nodes that ripple up the tree. For example, if the data with the key value of one in Leaf Node #1 208 is deleted from the tree, each node up to the root node would require adjustment. Operations that modify, or "mutate" the tree can be divided into groups of operations that can result in a modification of the tree structure, or operations that will modify, at most, a single node. Once the precise operation to be performed on a key/data tuple stored in a node of the tree is determined, the outcome of operation on other nodes of the tree can be assessed before any actual operations take place.

Tree Operations

In one embodiment, a pointer to each node that is locked and traversed along the path to an external node can be recorded in a lock table. Subsequently, the operation to be performed on that node can also be recorded once the operations are determined. In one embodiment, to perform standard B-tree actions on a file system metadata B-tree, an operation from a set of tree operations can be performed on the tree, including a Consolidate operation, a Split operation, a NodeKill operation, an Overwrite operation, and a NOOP, or No Operation. Of which, the Overwrite operation and NOOP result in a tree modification limited to the mutated node, and will not result in a subsequent tree adjustment. The Consolidate, Split, and NodeKill operations each occur when an operation at an external node requires subsequent operations at an internal node. For each action on an external node, one or more of the operations described above can be performed on a tree data structure.

Table 1 below maps tree actions with the operations that can potentially be performed on the external nodes in the various embodiments, as well their subsequent impact on parent internal nodes.

TABLE 1

B-Tree Node Operations.

| Action | Description | Leaf Ops | Parent Ops |
|---|---|---|---|
| Read | Read data at a key | NOOP | NOOP |
| Modify | Change data at a key. | Overwrite | NOOP |
| Insert | Insert key/data tuple(s) | Overwrite or Split | Overwrite, Split, or NOOP |
| Delete | Remove key/data tuple(s) | Overwrite, Consolidate, or NodeKill | Overwrite, Consolidate, NodeKill or NOOP |

As listed in the table above, an action to read data stored at a key in an external node will not result in any changes to the node, so a "no operation" (e.g., NOOP) is performed on the external node and the parent node. An action that is explicitly limited to an external node, such as an action to modify information stored at a key in an leaf node, can be limited to an Overwrite operation for the leaf node, with no subsequent impact to parent nodes (e.g., NOOP). To perform an action which inserts or deletes keyed tuples into a node, the current state of the node (e.g., full, min value, new node, root node, etc.) can be assessed, to determine the operation to use to perform the action on the node). For example, an insert action on a full node of a B-tree can result in a node split, in which the full node is split into two nodes, to allow the insertion of additional data. The data elements can then be rebalanced between the split node and the new sibling node, and a new key can be added to the parent node to represent the changes to the nodes.

A delete action on a full node can simply result in an overwrite operation on the node, with no additional impact on parent internal nodes, unless the deleted tuple is stored in the MinKey index, which can result in operations propagating up the internal nodes. A delete action that reduces the amount of data stored in a node below the minimum utilization for the node can result in a Consolidate operation. The Consolidate operation can perform both rebalance and merge actions. In a rebalance, data is rebalanced among siblings to maintain the minimum utilization of each node. In a merge, two nodes are merged into a single node.

A single, or a batch of actions that delete all tuples in an external node can result in a NodeKill operation, which can be used to delete entire nodes, rather than individual tuples from the node. If a sufficient number of nodes are deleted, the NodeKill operation can propagate up through the internal nodes, or internal nodes will require a Consolidate operation if the nodes become less full than their minimum capacity, which can be 50% full or 66% full in various embodiments.

Examples of tree operations are described with reference to the Exemplary File System Metadata Tree 200. Leaf Node #4 266 of the exemplary tree 200 has a free element, into which data with an associated key in the range (66, 80) can be inserted. Accordingly, an action to add a tuple, with a key value of 75 can be performed with an Overwrite operation into the free element of Leaf Node #4 266. The parent internal node, Index Node B 260 is unaffected, and no operation is required subsequent to the tuple insertion.

However, should an addition insert action be performed on Leaf Node #4, 266, or an insert action performed on, for example, Leaf Node #1 208, Leaf Node #2 232, or Leaf Node #6 294, then a split operation is performed prior to insertion. A split operation will have some impact on the internal nodes that are ancestors of the external node, the extent of the impact depending on whether the ancestor nodes are already full. For example, an insert action in to Leaf Node #6 294 causes the node to split into two nodes before the new value is added and the nodes rebalanced, if needed. Accordingly, a Split operation can be used on Leaf Node #6 294 to create a new node and add a new node.

Index Node C 292 has extra space for the key/pointer tuple that would be added following the split operation, so only an Overwrite operation is performed in Index Node C 292. If Index Node C 292 were full, an additional Split operation would be performed. In one embodiment, if a Split operation results in a root node split, a new root node is added and the tree height grows accordingly. In one embodiment, a Consolidate operation is implicitly performed after a split operation to rebalance tuples between the new node and the siblings of the node.

The determination of the outcome of a tree modification before the modification is performed can enable intelligent locking and traversal methods, which enhance the overall performance of a file system B-tree during concurrent accesses by multiple threads. Such methods include 1) Prioritized Lock Arbitration, 2) Fast Path Tree Traversal and 3) Two-Phase Mutation.

Prioritized Lock Arbitration

In one embodiment, a hierarchical file system utilizing B-tree variants for data or metadata storage can utilize prioritized lock arbitration improve concurrent access. An embodiment of prioritized lock arbitration includes three kinds of locks: Shared, Exclusive, and Upgrade locks.

In one embodiment, a "Shared" lock can be used when the locking thread has no immediate or intermediate plans to modify a node. Accordingly, the Shared lock can be analogized to a B-tree Read lock, as is known in the art. Any number of threads can acquire shared locks on a single node. The shared lock indicates to other threads that the locked node will be read, and the node should not be modified. An "Exclusive" lock is analogous to a standard B-tree Write Lock, in that the thread has immediate plans to modify a node. This allows the thread exclusive access to a node, so that the thread may modify the node as needed. However, if a thread is attempting to acquire an Exclusive lock on a node that is already locked by a different or unrelated thread, the thread must wait until all other locks on the node are released or must give up trying to take the lock if the node is locked by an "Upgrade" lock.

If a thread has intermediate plans to modify a node, or if a thread may possibly modify a node, or direct a related thread to modify a node in the near future, the thread can acquire an "Upgrade" lock on the node. With an Upgrade lock on a node, the thread can read the node while ensuring that the node will not be modified, while allowing other threads read access to the node via a Shared lock. If it is determined that a node will be modified, the thread can upgrade the Upgrade lock to an Exclusive lock before modifying the node. If a second thread attempts to acquire an Upgrade lock on a node while a first thread has an Upgrade lock, the second thread will wait until the lock is released. However, if the first thread has upgraded the Upgrade lock to an Exclusive Lock, the second thread will abort its operation and yield to the first thread, rather than waiting to acquire an upgrade lock on the node.

Table 2 below illustrates which behavior a thread will adopt based on the requested lock, and how the node is locked by other threads:

TABLE 2

Lock Arbitration Matrix.

| T1 | T2 | | | |
|---|---|---|---|---|
| | Free | Shared | Upgrade | Exclusive |
| Free | Go | Go | Go | Go |
| Shared | Go | Go | Go | Wait |
| Upgrade | Go | Go | Wait | Abort |
| Exclusive | Go | Wait | Wait | Wait |

As listed above, any thread can lock a node of the file system B-tree if no other thread has a lock on that node. Additionally, if a first thread (T1) has a Shared lock on a node, a second thread (T2) can also lock the node, unless thread T2 is attempting to acquire an Exclusive lock, which indicates that thread T2 will immediately modify the node. If thread T1 has a shared lock, and thread T2 attempts to acquire an exclusive lock, then thread T2 can wait on thread T1 until the lock is released. However, if thread T1 has an Upgrade lock on a node, and thread T2 attempts to acquire an Exclusive lock on the same node, thread T2 can abort the lock attempt, instead of waiting until thread T1 releases its Upgrade lock. In one embodiment, thread T2 can yield to other threads at this point and retry later.

Fast Path Tree Traversal

Prioritized locking can be utilized with a "Fast Path" tree traversal method that limits the number of locks held on an ordered tree data structure while traversing the tree. Fast Path traversal is a method of acquiring a leaf node in an ordered tree data structure by traversing the tree using "hand over hand" locking. In one embodiment, prioritized locks can also be used with Fast Path traversal. In one embodiment, lock path recording can be used to optimize Fast Path traversal logic.

In one embodiment, hand over hand locking is enabled by first locking the root node of the ordered tree containing the external node with the desired tuple to be accessed by the traversing thread. Initially, this includes locking the root node of a tree, and then searching for the key that indexes the sub-tree containing the desired external node. When the proper key is found, the child node referenced by the pointer in the key/pointer tuple of the internal node can be addressed and locked. This child node forms the root node of the sub-tree containing the external node containing the desired tuple. At this point the lock on the parent of the sub-tree root node can be released. Accordingly, this method holds locks on at most two nodes during tree traversal, and frees the other nodes for access by other threads.

Figure 3:
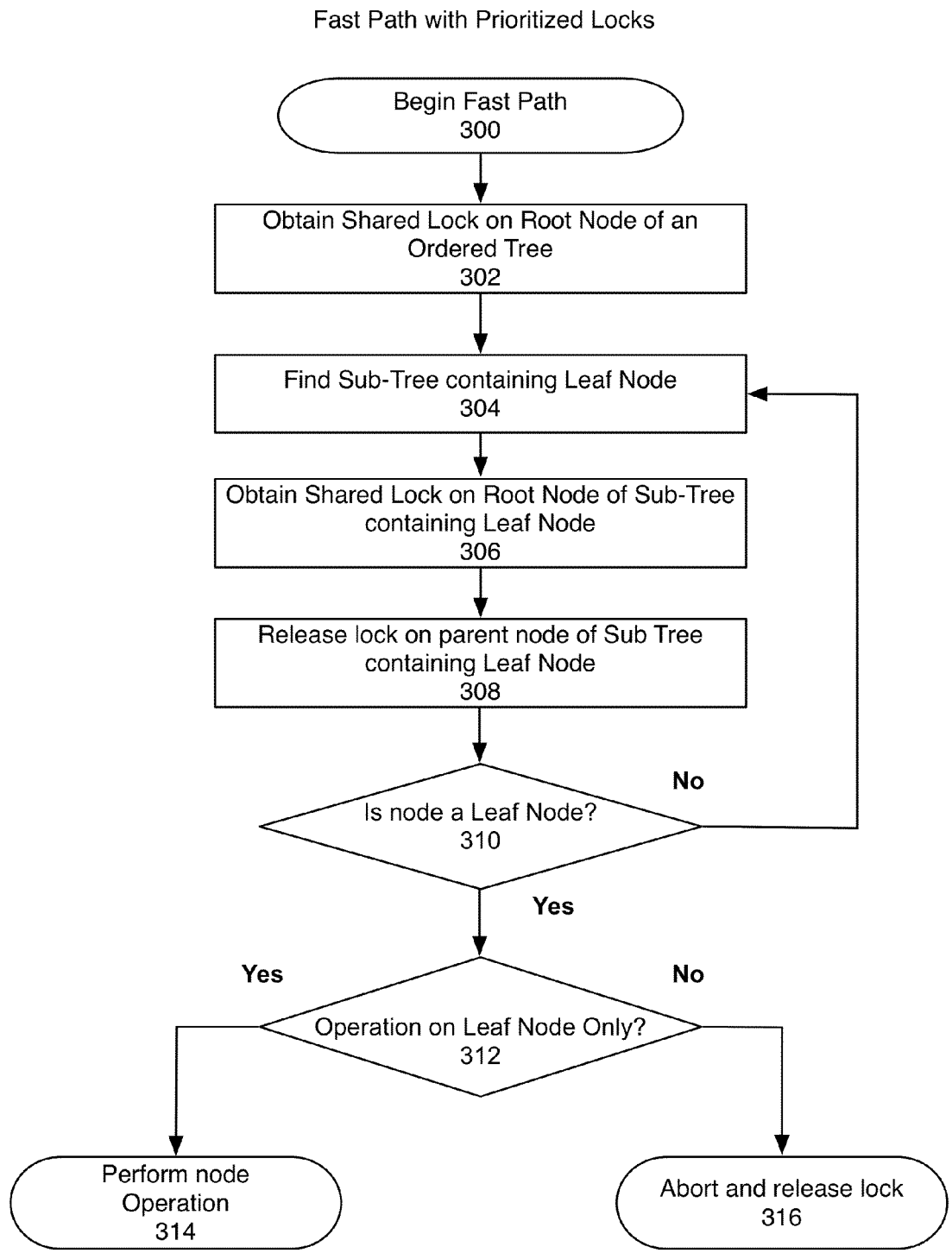
FIG. 3 illustrates an exemplary flowchart of the various operations of Fast Path traversal according to an embodiment.

FIG. 3 illustrates an exemplary flowchart of the various operations of Fast Path traversal according to an embodiment. The Exemplary Fast Path with Prioritized Locks combines fast path traversal with prioritized locks, to further increase tree concurrency, though in one embodiment, locking methods as known in the art can be used. In one embodiment, Fast Path traversal begins at block 300, where a thread of a data processing system will search an ordered tree, such as the Exemplary File System Metadata Tree 200 as illustrated in FIG. 2 for a tuple stored in an external node of the tree. As shown at block 302, the data processing system thread can obtain a lock, such as a shared lock, on a root node of an ordered tree data structure, and then use various search algorithms to select the desired key from the set of keys indexed in the root node. As shown in block 304, the node referenced by the desired key comprises the root node of the sub-tree containing the external node. At this point, the thread can acquire a shared lock on the root node of this sub tree, as shown in block 306. At block 308, the thread can release the previously held lock on the parent node of the sub-tree root node, allowing the freed node to be locked by other threads, such as a thread that has been waiting on the previously held shared lock, so that the waiting thread can acquire an exclusive lock.

This logic process can repeat, returning to block 304, if, as determined at block 310, the locked node is still an internal node of the tree, and not an external, or leaf node as desired. If, at block 310, it is determined that the locked node is the desired leaf node, the thread can proceed to block 312, to determine if the operation to be performed on the leaf node will impact only the leaf node, and no other nodes in the tree, or if the operation is one that will cause changes to other external or internal nodes of the tree. If the operation will only impact the locked leaf node (e.g., a NOOP), then that operation can be performed at block 314. An action to read data at a key can be performed without modifying the node. If the leaf node is locked with a shared lock, an action to modify data in the node can release the shared lock on the node and acquire an Exclusive lock before modifying the node. If the action utilizes an operation that impacts other threads (e.g., a Split or NodeKill operation), then, at block 316, the traversal is aborted, and the lock on the leaf node is released.

Utilizing Fast Path traversal allows an external node to be located while reducing the number of locks held on the tree, which enhances the number of concurrent accesses that can be performed on the tree. The processes described assume that the requested action can be performed without modifying any node other than the leaf node, which is true for most of the actions that will be performed on the tree. In the event other nodes would be modified, instead of attempting to re-acquire locks upward along the traversal path to the root node, the action on the tree is aborted. In one embodiment, the operation is immediately re-tried, using an alternative traversal method.

A follow up-traversal of the tree following an aborted Fast Path operation can be performed as a low-latency action via the use of a low-latency storage cache. During the Fast Path traversal, any traversed nodes not already in the storage cache will result in a cache-miss, and will be loaded into cache. Accordingly, a follow-up traversal after a failed Fast Path traversal follows an "Assured Retry Path", and can execute with high performance, as the relevant data can be accessed, and the relevant modifications can be performed, while the data is in the storage cache.

Lock Path Recording

In one embodiment, a pointer, or some other identifier or reference to each node is stored in a "Lock Path" data structure when a lock is acquired on the node during traversal. While the Lock Path data structure is not limited to any particular manner of tree locking or traversal, an embodiment can use the Lock Path to improve the performance of any successive secondary tree traversals after an aborted Fast Path traversal, allowing a thread to immediately re-lock the traversal path if no intervening changes to the tree structure occurs between the Fast Path Traversal and the follow-up traversal. In the event an intervening change does occur, a search to find the correct node can be quickly performed, as the node will be in the storage cache. With reference to FIG. 2, a table illustrating an exemplary Lock Path that can be generated during a traversal for an insert action into Leaf Node #1 208 is shown in Table 3 below.

TABLE 3

Exemplary Lock Path during tree traversal to Leaf Node #1.

| Path Index | Node | Node Index |
|---|---|---|
| 0 | Root Node | 0 |
| 1 | Index Node A | 0 |
| 2 | Leaf Node #1 | 1 |

The exemplary lock path listed above references a tree traversal used to insert or delete a tuple with a key value of less than 30, which would be inserted into, or deleted from Leaf Node #1 208. For example, an embodiment of Fast Path traversal can begin at the root of the tree (e.g., Root Node 248). Once the root node is locked, a pointer or indicator for the node can be stored in a Lock Path data structure for later reference, as shown in Table 3 at Path Index 0. Next, the index in the node containing the key/pointer tuple for the next sub-tree can be determined. A tuple with a key value of less than 30 is also less than the key value 48, so the highest key index with a value less than 48 is selected. In the example in Table 3, the highest value key is 1, at node index 0. Accordingly, the index value of zero can be stored in the Lock path for Path Index 0, and the node can be traversed via the pointer associated with the key. In one embodiment of the Lock Path (not shown in Table 3), a position for the operation on the locked node is available, and the operation can be preserved in the Lock Path.

Continuing the exemplary traversal, in the next index of the data structure a pointer, or other indicator to Index Node A 230 can be stored in the Lock Path data structure at Path Index 1, along with the index in the node data structure where the key/pointer tuple to the next sub-tree can be found (e.g., Node Index 0, containing the key value of 1). Using Fast Path traversal, once the root node of a sub-tree containing the range of nodes on which the action will be performed, the parent of the sub-tree can be unlocked. In this manner, the tree can be traversed in a hand over hand fashion; locking a node, recording the node information, and releasing the lock on the parent node, until the external node containing the desired tuples, or into which tuples will be inserted, is found, in this case, Leaf Node #1 208.

In one embodiment, once the external node is locked, the parent node of the external node can be unlocked. An embodiment can then determine what operation or operations will be performed on the external node, and the Fast Path traversal can abort if any node other than the external node requires modification. A file system implementing a Fast Path traversal to delete, for example, the (8, 4) tuple in Index Node #1 208 can store the external node's pointer, or some other identifier in the Lock Path, along with the index in the node which the tuple is stored (e.g., index 1) as shown in Table 3 at Path Index 2. However, an embodiment of Fast Path traversal to perform an insert action can abort if it is discovered that the target external node (e.g., Leaf Node #1 208) is full.

Several techniques are available to determine whether an operation will impact only the locked external node. In one embodiment, the determination can be made once the external node has been locked and analyzed, and the operation to be performed is determined. As shown in Table 1, in one embodiment a read action can be performed using Fast Path traversal because the external node will not be modified, which means read actions are NOOPs from a tree modification perspective. An operation to modify data at a key can also be performed with a single Overwrite operation without impacting other nodes in the tree. Accordingly, an embodiment can determine that Fast Path traversal will be successful by determining that the desired action can be performed using a NOOP or Overwrite operation. If a Split, Consolidate, or NodeKill operation is to be performed on the node, the Fast Path traversal can abort, and re-try using an alternative traversal method. A Traversal and Two Phase Mutation method for complex tree mutations is provided in FIG. 4 and FIG. 5. A more detailed description of methods to determine the type of operation to utilize for a tree action is provided in FIG. 6 and FIG. 7, which are discussed below.

Two Phase Mutation

Two Phase Mutation is a method of modifying nodes in an ordered tree, particularly a file system metadata B-tree, which can be used for all node modifications, or as an alternative to Fast Path traversal. In one embodiment, a tree is traversed using Fast Path traversal, and if the leaf node cannot be modified without impacting the parent node of the leaf node, the tree is re-traversed, and Two Phase Mutation is performed. In one embodiment, the tree re-traversal utilizes a storage cache that has been pre-loaded by a Fast Path traversal. In one embodiment, Fast Path traversal maintains a Lock Path, such that each node in the path can be re-locked without requiring a tree re-traversal if there are no intervening changes to the node. In one embodiment, Two Phase Mutation is the default method of tree modification, and the tree is traversed to acquire the appropriate locks, and to generate a Lock Path.

Two Phase Mutation attempts to minimize the duration in which nodes are held in non-concurrent locks by performing operations in two phases, a "Pre-Flight" phase, and a "Fix" phase. In one embodiment, the Pre-Flight phase examines the lock path to determine the result of the mutation at each impacted node, before performing the actions in the Fix phase. In one embodiment, the Pre-Flight phase utilizes a Lock Path data structure and records the tree operations to perform on the nodes in the path during Fix phase. For a tree traversal preceding a Two Phase Mutation, locks are maintained on each node on the path from the root to the leaf, and a Lock Path is created. In one embodiment, Two Phase Mutation utilizes prioritized locking, and a semi-concurrent lock, such as an Upgrade lock, is used to lock the nodes of the tree prior to the Pre-Flight phase. Once the path is locked, the Pre-Flight phase can traverse the Lock Path from leaf to root, to determine the operations to perform on the tree.

Figure 4:
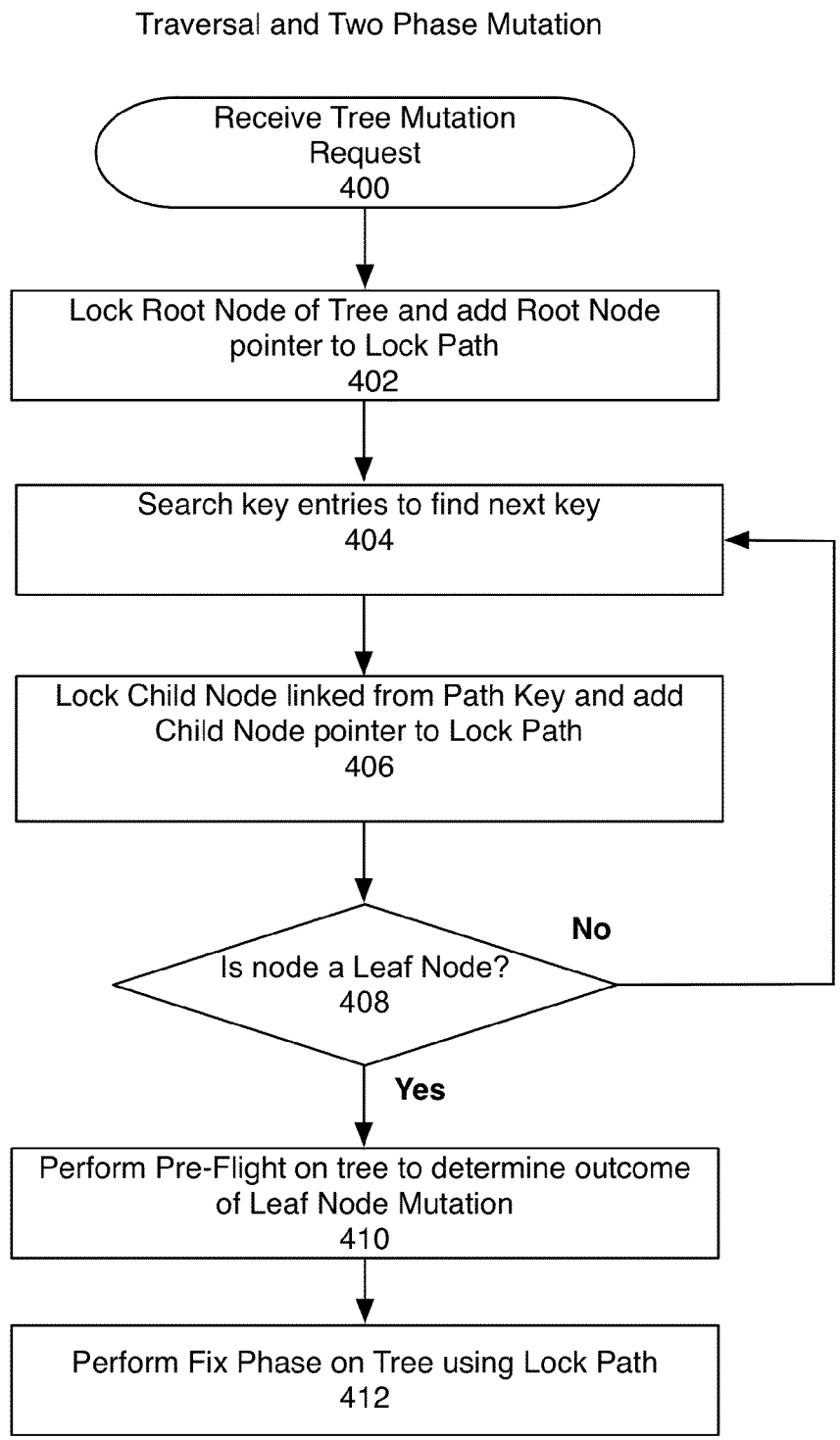
FIG. 4 is a flow diagram of tree traversal and Two Phase Mutation according to an embodiment.

FIG. 4 is a flow diagram of tree traversal and Two Phase Mutation according to an embodiment. In one embodiment, an execution thread of a file system on a data processing system begins when the thread receives a Tree Mutation Request 400 to insert, delete, or otherwise change tuple data in an external node of a file system tree. In an embodiment without a pre-existing lock path for this operation, the thread can perform an operation 402 to lock the Root node of the tree, and then add a pointer or other identifier for the Root node to the Lock Path. The thread can then perform a search operation 404 using any number of search algorithms to find the key/pointer tuple for the next node. The thread can then traverse to the next node, where an operation 406 is performed to lock the child node linked from the root node, and add a pointer or indicator for the child node to the Lock Path. An operation 408 to determine if the locked node is a leaf node is performed, and if the leaf node has not been acquired, the thread can return to operation 404 to search the keys entries to find the next key containing the pointer for the next node.

If the child node that is locked in operation 406 is a leaf node, as determined by operation 408, then the Pre-Flight method is performed to determine the outcome of the requested leaf node mutation, as shown in block 410. As the Pre-Flight method determines the set of operations to perform on the tree, the operations are added to the Lock Path. As shown in block 412, the Fix phase is performed on the tree using the information stored in the Lock Path. In one embodiment, an upgradable lock (e.g., Upgrade lock) is acquired on each node in the Lock Path, to enable Prioritized Lock Arbitration An exemplary Lock Path created during the tree traversal and two-phase mutation is shown in Table 4 below.

TABLE 4

Exemplary Two Phase Mutation Lock Path.

| Path Index | Node | Node Index | Operation |
| --- | --- | --- | --- |
| 0 | Root Node | 0 | NOOP |
| 1 | Index Node A | 0 | Overwrite |
| 2 | Leaf Node #1 | 0 | Split |

An action to insert a key/data tuple into the Exemplary File System Metadata Tree 200 of FIG. 2 can begin by locking the Root Node 248, and adding a pointer, or other indicator for the Root Node 248 to the Lock Path, along with the index in which the tuple is stored in the node. In one embodiment, as shown at Path Index 0 in Table 4, a pointer, or other indicator for Root Node 248 is stored, along with the index containing the tuple linking to the next sub-tree. Additionally, a position can be available in the Lock Path to store the operation to be performed, as shown in the Operation column of Table 4.

Figure 6:
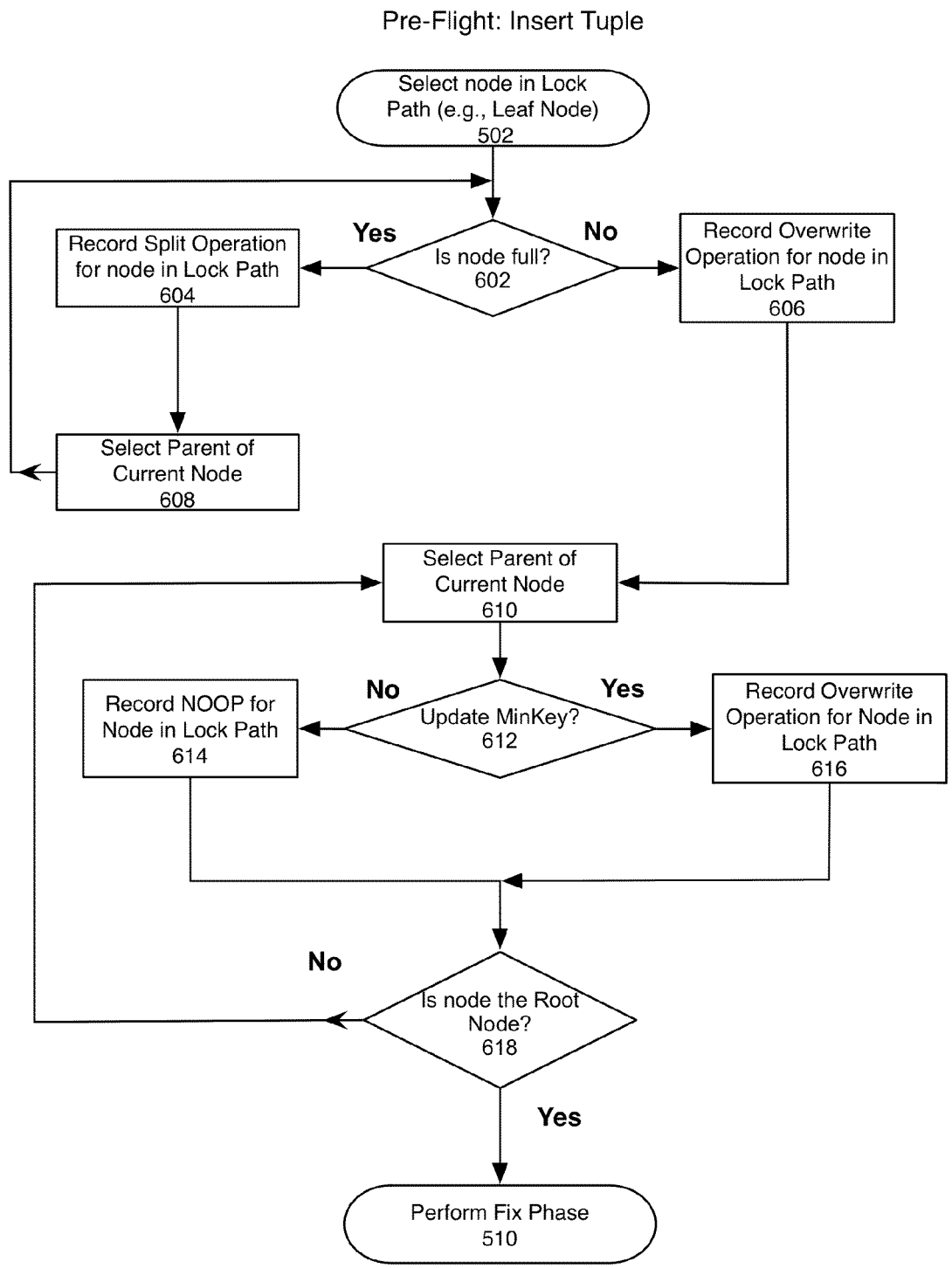
FIG. 6 is a flow diagram of a Pre-Flight to insert a tuple into an external node, according to an embodiment.
Figure 7:
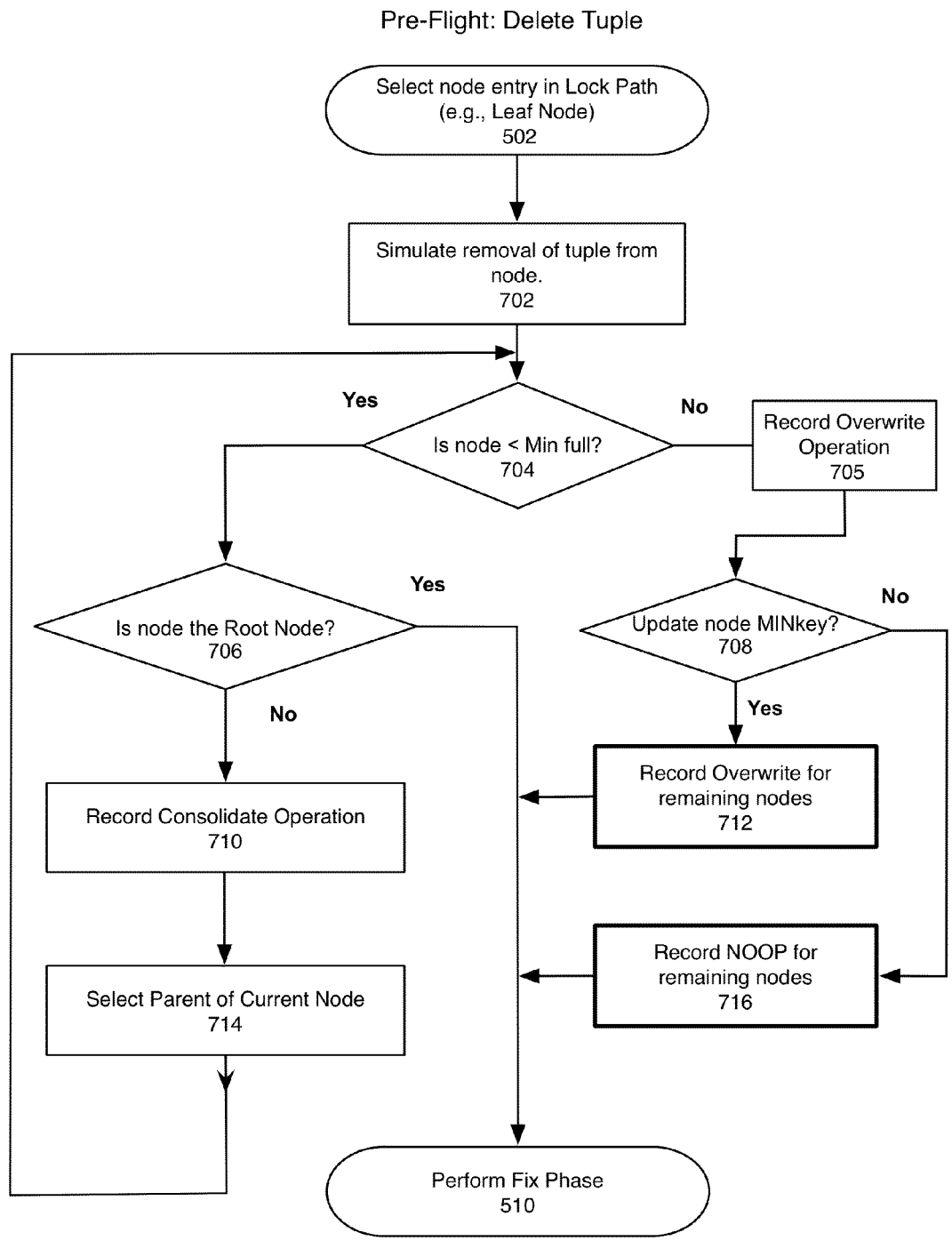
FIG. 7 is a flow diagram of a Pre-Flight to delete a tuple from an external node, according to an embodiment.

To insert a tuple with a key value of less than 30, the pointer 220 to the node linked from the key value of 1 (e.g., Index Key 210) is referenced. In the exemplary case, the pointer 220 references Index Node A 230. Accordingly, Index Node A 230 is locked and an indictor for Index Node A 230 is added to the Lock Path, as shown in the Table 4 entry at Path Index 1. Once the leaf node containing the tuple to modify (e.g., Leaf Node #1 208) is found, the node is locked, and information for the node, including the index containing the tuple to modify, is stored in the Lock Path, as shown at Path Index 2 of Table 4. Exemplary methods to determine the operation to apply to the nodes in the lock path are illustrated in FIGS. 5-7, and are further described below.

Figure 5:
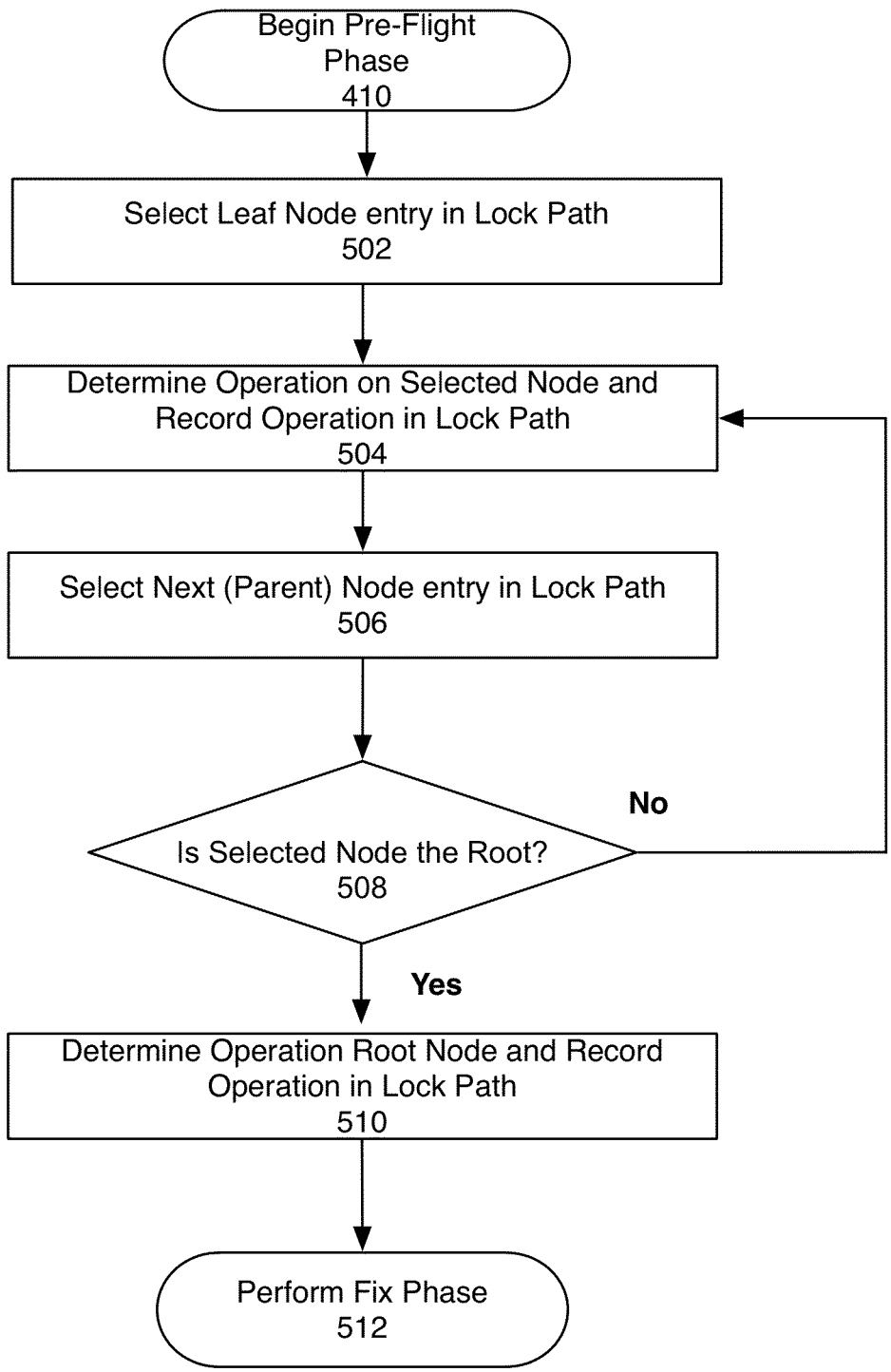
FIG. 5 is a flow diagram of a Two Phase Mutation Pre-Flight Operation according to an embodiment.

FIG. 5 is a flow diagram of a Two Phase Mutation Pre-Flight Operation according to an embodiment. Pre-Flight phase operations 410 can begin after traversing the tree and building a Lock Path. The Lock Path is then reverse indexed from the leaf node back up to the root node. As shown at block 502, the entry for the leaf node in the Lock Path is selected. At block 504, the tree mutation operation to perform the node mutation can be determined, and the operation can be stored in the Lock Path. At block 506, the next node in the Lock Path is selected. The next node will be the parent node of the previous entry. As shown at block 508, if the selected node is not the root node, execution returns to block 504, to determine the tree mutation operation, and to record the operation in the Lock Path. Once the selected node is the root node, execution proceeds to block 510, where the operation on the root node is determined and written into the Lock Path. Once the operations are determined in the Pre-Flight phase, execution proceeds to the Fix phase, as shown in block 512. In one embodiment, the Lock Path can be generated during a Fast Path traversal, and the nodes can be locked using the pointers or identifiers stored in the Lock Path.

The Pre-Flight phase can be further described with reference to the exemplary Two Phase Mutation Lock Path shown in Table 4, which is a Lock Path for an insert action into Leaf Node #1 208 of the Exemplary File System Metadata Tree 200, although other forms of ordered tree data structures for use in file systems are also contemplated. For example, at Path Index 2, the entry for the leaf node (e.g., Leaf Node #1 208) is selected, and the action on the node is evaluated. An action to insert a tuple into the external node of the exemplary B-Tree can result in a Split Operation or an Overwrite operation, based on the state of the external node. If the external node is full, a Split operation can be performed on the external node, which can split the external node and insert the additional tuple. Key changes precipitated by the split can be performed by an operation on the parent node.

As shown in Table 4 at Path Index 2, an embodiment can record a Split operation for Leaf Node #1 208 because the node is full. The next node is Index Node A 230, which is the parent node of Index Node #1 208, will require at least one insert action to insert the MinKey of the new child node, and will be split if required. In this instance, Index Node A 230 has a free element in which a new key can be inserted, so an Overwrite operation can be recorded for this node. Following the Overwrite operation at Path Index 1, the next node is selected, which is the Root Node 248. If the Overwrite operation to Index Node A changed the MinKey of the node, then an Overwrite operation is recorded for the Root Node 248, to update the Root Node MinKey. If the MinKey for Index Node A 230 is unaffected, then a NOOP is recorded for the Root Node 248, as indicated at Path Index 0 in the exemplary Lock Path of Table 4.

FIG. 6 is a flow diagram of a Pre-Flight to insert a tuple into an external node, according to an embodiment. An embodiment of a file system utilizing Two Phase Mutation can begin a Pre-Flight phase to insert a tuple into an external node by selecting the node in the highest index of a Lock Path created from a previous traversal, as shown at block 502. An operation 602 can determine if the node is full. If the node is full, a Split operation can be recorded in the Lock Path at the Path Index for that node, as shown at block 604. However, if there is space to insert a new tuple, an Overwrite operation can be recorded for the node, as shown at block 606. After a Split operation is recorded at block 604, an operation 608 to select the parent node of the current node, and the operation at block 602 is performed once more, to determine if the key for the new node created from the split can be stored.

If once again the node is full, a Split operation can be recorded in the Lock Path, as shown at block 604. This sequence can propagate a split up to the root node of the tree if each node in sequence is full, resulting in a new root node, which will have at least one free element.

Once a selected node has an empty element (e.g., the node is not full), an Overwrite operation can be recorded for the node, as shown in block 606. Once an Overwrite operation is recorded, the parent node of the current node can be selected, as shown at block 610, and an operation 612 can be performed determine if the MinKey (e.g., the key stored at index 0 of the node) requires an update due to the tree mutations below. If it is determined, as shown at block 612, that the MinKey is to be updated, an Overwrite operation is recorded for the node, as shown at block 616. If the node will not be updated, a NOOP is recorded for the node, as shown at block 614. Next, at block 618 it can be determined whether the current node is the root node (e.g., the Path Index is 0). If the current node is not the root node, the parent of the current node is selected at block 610, and the MinKey check can be performed once more, as shown at block 612. Once it is determined, at block 618, that the root node has been processed, the Pre-Flight phase is complete, and execution can proceed to the Fix Phase at block 510, as further illustrated in FIG. 8.

FIG. 7 is a flow diagram of a Pre-Flight to delete a tuple from an external node, according to an embodiment. An embodiment of a file system utilizing Two Phase Mutation can begin a Pre-Flight phase to delete one or more tuples from an external node by selecting the node in the highest index of a Lock Path created from a previous traversal, as shown at block 502. An operation 702 to simulate the deletion of the tuple from the node can be performed to determine the outcome of the delete action on the tree.

For example, the operation 702 can subtract the number of tuples to delete during the requested delete action from the number of tuples stored in the node, and an operation shown at block 704 can determine if the delete action will reduce the node below the minimum node utilization value for the tree. In one embodiment, the file system utilizes a B-tree variant with 50% minimum utilization for non-root nodes; though some B-tree variants contemplated have 66% minimum utilization for non-root nodes. If the delete action does not reduce the node below minimum utilization, an Overwrite operation is recorded for the node, indicating that one of the tuples in the node will be overwritten to free the tuple, as shown at block 705. If the delete action requires internal parent nodes to update the MinKey value, as determined in operation 708, then each remaining node in the Lock Path can be marked for overwrite, as shown at block 712, so that each node MinKey value can be updated during the Fix Phase. If the MinKey does not require an update, no further operations are required for the delete action, and the remaining nodes in the path can be marked with a NOOP, as shown at block 716. Once an operation for each node in the Lock Path is recorded, execution can continue to block 510 to perform the Fix Phase.

Returning to block 704, if delete action will cause the node to fall below the minimum utilization for non-root nodes, the node is checked against the root node exception at block 706. If the current node is the root node, then the Pre-Flight phase is complete, and execution can proceed to block 510 to perform the Fix phase. If the current node is not the root node, then a Consolidate operation is recorded in the Lock Path for the current node, as shown at block 710, and the parent node of the current node is selected, as shown at block 714, until each node in the Lock Path is processed. In one embodiment, a NodeKill operation (not shown) is available to remove an entire node if each tuple in the node is deleted.

Once the operations for each node along the Lock Path have been determined, a file system utilizing an embodiment of Two Phase Mutation can enter the Fix phase, where each operation listed can be performed in a top down manner. Determining the set of operations to perform on the tree during the Pre-Flight phase can enhance the concurrent performance of the system by minimizing the time spent holding non-concurrent locks on nodes of the tree. In one embodiment, concurrent read locks, or other shareable locks are used to maintain read access on each node in the lock path during Pre-Flight. In one embodiment, prioritized lock arbitration is used, and Upgrade locks are taken on each node during the Pre-Flight phase. When Upgrade locks are used, the lock can be easily upgraded to an Exclusive lock, without requiring the lock on the node to be released and re-acquired before modifying a node.

Figure 8:
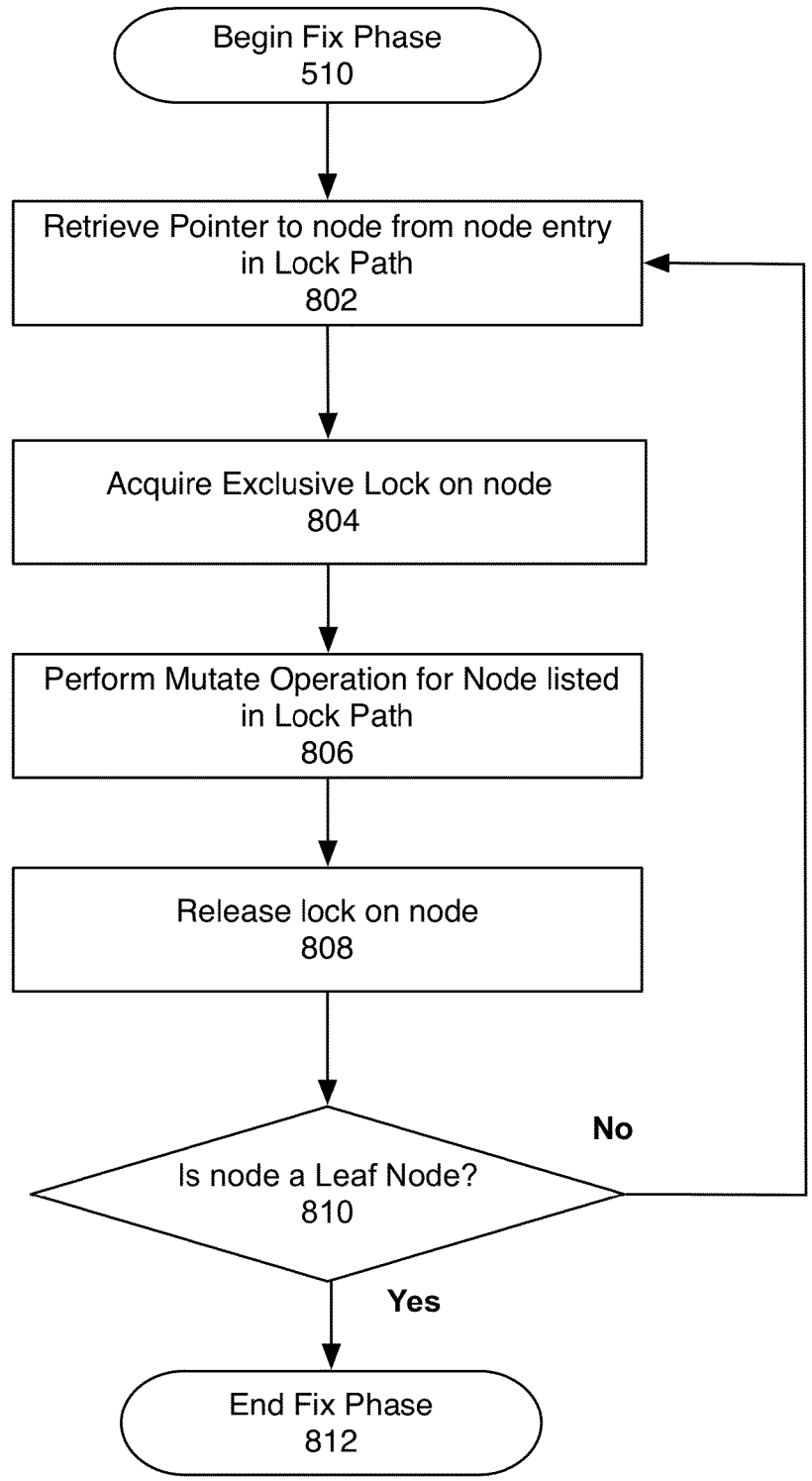
FIG. 8 is a flow diagram of a Fix Phase for Two Phase Mutation according to an embodiment.

FIG. 8 is a flow diagram of a Fix Phase for Two Phase Mutation according to an embodiment. In one embodiment, after the Fix Phase begins, as shown at block 510, execution can proceed to block 802, where a pointer, or other indicator or identifier for the node at Path Index 0 (e.g., the root node) is retrieved from the beginning of the Lock Path. Next, an Exclusive lock on the node is acquired, as shown at block 804. In one embodiment, the node is locked with an Upgrade lock, which can be upgraded to an Exclusive lock. In one embodiment, a read lock, a shared lock, or some other non-exclusive lock is released, and an Exclusive lock, or the equivalent, is acquired on the node, so the node may be modified, although an embodiment using a release-and-reacquire method may experience a deadlock if lock-reacquisition logic is not additionally utilized to manage the lock re-acquisition on the node. As shown at block 806, the listed mutate operation (e.g., Overwrite, Split, Consolidate, etc.) is performed on the node, before the lock on the node is released, as shown at block 808. If a NOOP is listed, an embodiment can immediately release the lock on the node, as no operations will be performed, and others can freely access the node. Execution can continue in this manner, returning to the operation at block 802 and processing each node in the Lock Path, until an operation at block 810 determines that the recently processed node is a leaf node (e.g., the highest index in the Lock Path). At this point, execution can proceed to block 812, where the Fix Phase is finalized.

Figure 9:
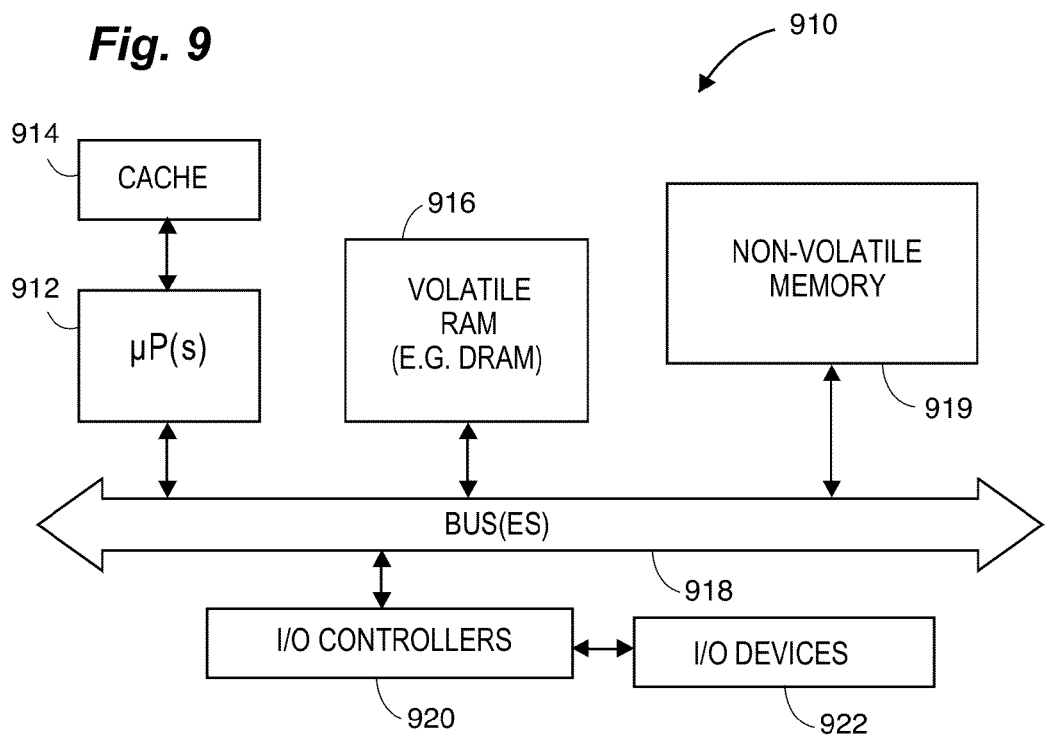
FIG. 9 is a block diagram of an exemplary data processing system employing a file system according to an embodiment.

FIG. 9 is a block diagram of an exemplary data processing system employing a file system, which can implement one or more of the embodiments described. The data processing system 910 can be a server, or a workstation computer system, a mobile data processing system, such as a smartphone or tablet computer, or some other computer system, such as a laptop computer system. The data processing system 910 can include one or more microprocessors or other logic units 912 coupled to an cache memory system 914 which, in one embodiment, can be static random access memory (SRAM), as known in the art. The one or more microprocessors 912 can couple to the rest of the system via one or more system buses 918, which can also couple the one or more microprocessors 912 to main memory, which, in one embodiment, can be volatile random access memory, such as dynamic random access memory (DRAM). In one embodiment, the volatile ram 912 contains a storage cache, which stores recently, or frequently accessed data in memory for fast data access. The system 910 can also include one or more input/output controllers 920, which couple the one or more input/output devices 922 with the rest of the system through the one or more buses 918. The system 910 can also include a non-volatile memory 919, which can be a conventional magnetic disk drive, a solid state drive, or a composite disk, such as a combination of a solid state, drive and a conventional magnetic disk drive.

Figure 10:
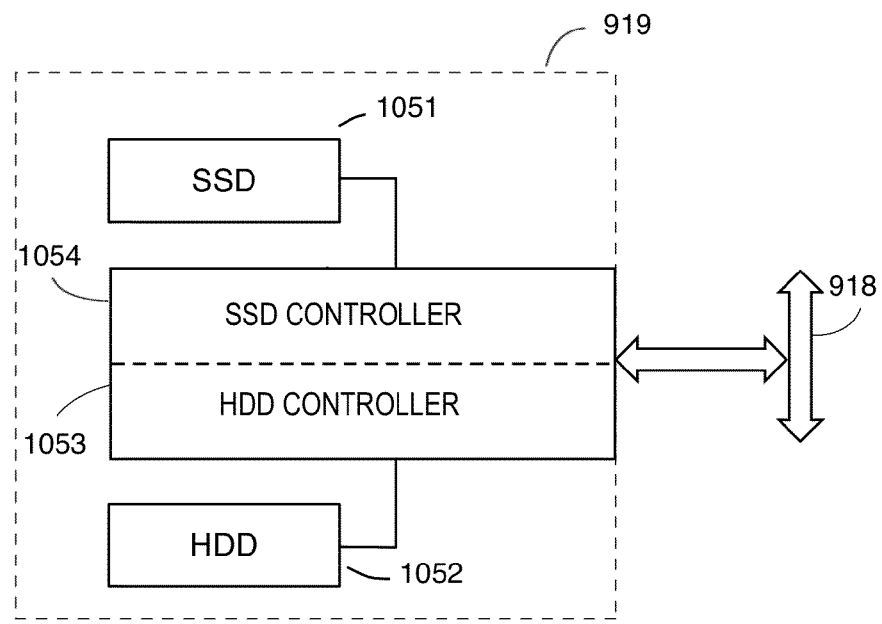
FIG. 10 shows an example of a non-volatile memory based data storage system, which can be managed using an embodiment of the file system described.

FIG. 10 shows an example of a non-volatile memory based data storage system, which can be managed using an embodiment of the file system described. In one embodiment, the non-volatile memory 919 of FIG. 9 can include a solid-state drive 1051 and a magnetic disk drive 1052. In one embodiment, the non-volatile storage system can be treated as a single logical volume or a single block device by the file system and operating system. The solid-state drive can consist of one or more banks of single level cell (SLC) or multi level cell (MLC) flash memory, or some other electrically erasable semiconductor memory. One or more controllers, such as controller 1054, which includes a solid-state drive controller, and controller 1053, which includes a hard disk drive controller, can control the various storage devices in the non-volatile memory system 919. The one or more controllers can couple the composite drive shown in FIG. 10 to the rest of the components in system 910 through the bus 918.

In the foregoing specification, the various embodiments have been described with reference to specific exemplary embodiments thereof. It will be evident that various modifications may be made thereto without departing from the broader spirit and scope as set forth in the following claims.

The specification and drawings are, accordingly, to be regarded in an illustrative sense rather than a restrictive sense.

It will be apparent from this description that aspects of the various embodiments can be implemented, at least in part, in software. That is, the techniques may be carried out by an apparatus in a data processing system in response to a processor executing a sequence of instructions contained in volatile or non-volatile memory, or a combination of such memories, which together may embody a non-transitory machine-readable storage medium. Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry. Thus the techniques are not limited to any specific combination of hardware circuitry and software, or to any particular source for the instructions executed by the data processing system associated an apparatus for performing one or more of the operations described herein.

What is claimed is:

1. A non-transitory computer-readable medium with instructions stored therein, the instructions, when executed by a processor, cause the processor to perform operations to modify a node in an ordered tree data structure, the operations comprising:
    locking a first node in the ordered tree data structure, and adding an identifier of the first node to a path data structure separate from the ordered tree data structure;
    searching the first node for an indicator to a second node in the ordered tree data structure;
    locking the second node in the ordered tree data structure, and adding an identifier of the second node to the path data structure;
    determining a set of operations to perform on the ordered tree data structure, the operations responsive to a modification of the second node;
    adding the set of operations to the path data structure; and
    performing the set of operations stored in the path data structure on the ordered tree data structure.

2. The computer-readable medium of claim 1, wherein locking the first node includes acquiring an upgradeable lock on the first node.

3. The computer-readable medium of claim 2, wherein locking the second node includes acquiring an upgradeable lock on the second node.

4. The computer-readable medium of claim 3, wherein performing the set of operations stored in the path data structure includes upgrading the upgradeable lock on the second node to an exclusive lock.

5. The computer-readable medium of claim 4, wherein upgrading the upgradable lock on the second node includes preventing any other locks on the second node.

6. The computer-readable medium of claim 5, further comprising attempting to acquire an upgradeable lock on the second node, and aborting the attempting to acquire the upgradable lock responsive to detecting an exclusive lock on the second node.

7. The computer-readable medium of claim 6, wherein determining the set of operations to perform on the ordered tree data structure includes determining an operation selected from a group of tree operations impacting one or more nodes, the operations consisting of: Overwrite, Split, Consolidate, and NodeKill, wherein the NodeKill comprises removing a node from the ordered tree data structure.

8. The computer-readable medium of claim 1, wherein determining a set of operations to perform on the ordered tree data structure includes:
    selecting the second node using an entry for the second node in the path data structure;
    referencing the second node using the identifier for the second node, to determine a set of characteristics of the second node, the set of characteristics including the number of data elements stored in the first node and the capacity of the second node;
    determining an operation to be performed on the second node, the operation determined using an action to be performed on the second node, and at least one characteristic in the set of characteristics of the second node; and
    recording the operation in the path data structure.

9. The computer-readable medium of claim 8, wherein determining a set of operations to perform on the ordered tree data structure further includes:
    selecting the first node using an entry for the first node in the path data structure, wherein the first node is a parent node of the second node;
    referencing the first node using the identifier for the first node, to determine a set of characteristics of the first node, the set of characteristics including the number of data elements stored in the first node and the capacity of the first node; and
    recording an operation determined to be performed on the first node in the path data structure, the operation determined using the operation to be performed on second node, and at least one characteristic in the set of characteristics of the first node.

10. The computer-readable medium of claim 9, wherein the ordered tree data structure is a B-tree data structure, wherein the B-tree data structure includes metadata for a hierarchical file system.

11. A computer implemented method to determine an operation to perform on data stored on a storage device of a data processing system, the data organized by a hierarchical file system, the method comprising:
    referencing a node in an ordered tree data structure of the hierarchical file system via an identifier for the node, the identifier stored in a path data structure separate from the ordered tree data structure;
    determining an operation to perform on the node, the operation to modify data in one or more nodes of the ordered tree data structure, wherein determining the operation to perform includes:
        determining a set of characteristics of node, the set of characteristics including the number of data elements stored in the node and the capacity of the node, and
        selecting an operation to perform on the node, the operation selected using constraints defined by factors including the ordered tree data structure used to store metadata for the file system, at least one characteristic in the set of characteristics of the node, and an action to perform on the node, wherein the action to perform on the node includes modifying file system metadata stored in the node.

12. The computer implemented method of claim 11, wherein selecting the operation to perform on the node includes selecting an Overwrite operation, wherein the action to perform on the node consists of an insert action, and wherein the number of elements stored in the node is less than the capacity of the node.

13. The computer implemented method of claim 11, wherein selecting the operation to perform on the node includes selecting a Split operation, wherein the action to perform on the node consists of an insert action, and wherein the number of elements stored in the node is equal to the capacity of the node.

14. The computer implemented method of claim 11, wherein selecting the operation to perform on the node includes selecting a Consolidate operation, wherein the action to perform on the node consists of a delete action, and wherein the number of elements stored in the node is less than two thirds of the capacity of the node.

15. The computer implemented method of claim 14, wherein selecting the operation to perform on the node includes selecting a Consolidate operation, wherein the action to perform on the node consists of a delete action, and wherein the number of elements stored in the node is less than one half of the capacity of the node.

16. The computer implemented method of claim 11, wherein selecting the operation to perform on the node includes selecting a NodeKill operation to remove the node from the ordered tree data structure, wherein the action to perform on the node consists of a delete action, and wherein the delete action deletes all elements stored in the node.

17. A computer implemented method at a data processing system, the method to modify an ordered tree data structure of a hierarchical file system, the hierarchical file system to organize data on a storage device at the data processing system, the method comprising:
   locking a first node in the ordered tree data structure for the hierarchical file system, wherein the ordered tree data structure stores metadata for the hierarchical file system;
   locking a second node in the ordered tree data structure;
   determining a set of operations to perform on the ordered tree data structure, the operations responsive to a modification of the second node;
   adding the set of operations to a path data structure separate from the ordered tree data structure; and
   performing the set of operations stored in the path data structure.

18. The computer implemented method of claim 17, further comprising adding an identifier of the first node to the path data structure, and searching the first node for an indicator to the second node.

19. The computer implemented method of claim 17, further comprising reading an identifier of the first node from the path data structure, and reading an identifier for the second node from the path data structure.

20. The computer implemented method of claim 17, wherein determining the set of operations to perform on the ordered tree data structure includes determining an operation selected from a group of tree operations affecting one or more nodes, the operations consisting of: Overwrite, Split, Consolidate, and NodeKill, wherein the NodeKill comprises removing a node from the ordered tree data structure.

21. The computer implemented method of claim 20, wherein performing the set of operations stored in the path data structure includes:
   upgrading a first upgradeable lock on the first node to a first exclusive lock, and performing a first operation from the set of operations, the first operation corresponding to the first node, after upgrading the first upgradeable lock to the first exclusive lock; and
   upgrading a second upgradeable lock on the second node to a second exclusive lock, and performing a second operation from the set of operations, the second operation corresponding to the second node, after upgrading the second upgradeable lock to the second exclusive lock.

22. The computer implemented method of claim 21, further comprising attempting to acquire an upgradeable lock on the first node, and aborting the attempting to acquire the upgradable lock responsive to detecting an exclusive lock on the first node.

23. A data processing system comprising:
   a data storage device to store data organized by a hierarchical file system;
   a non-transitory machine readable storage medium storing instructions to interface with the hierarchical file system;
   one or more processors to execute the instructions stored on the storage medium, wherein execution of the instructions causes the one or more processors to perform operations to modify a node in an ordered tree data structure of the hierarchical file system, the operations to:
      lock a first node in the ordered tree data structure for the hierarchical file system, wherein the ordered tree data structure stores metadata for the file system and add an identifier of the first node to a path data structure separate from the ordered tree data structure,
      lock a second node in the ordered tree data structure, and add an identifier of the second node to the path data structure,
      determine a mutate operation to perform on the ordered tree data structure, based on an action to perform on the second node, and one or more characteristics of the second node,
      add the mutate operation to the path data structure, and
      perform the mutate operation in the data structure.

24. The system as in claim 23, wherein the mutate operation consists of an Overwrite operation, wherein the action to perform on the second node consists of an insert action, and wherein the number of elements stored in the node is less than the capacity of the node.

25. The system as in claim 23, wherein the mutate operation consists of a Split operation, wherein the action to perform on the node consists of an insert action, and wherein the number of elements stored in the node is equal to the capacity of the node.

26. The system as in claim 23, wherein the mutate operation consists of a Consolidate operation, wherein the action to perform on the node consists of a delete action, and wherein the number of elements stored in the node is less than two thirds of the capacity of the node.

27. The system as in claim 26, wherein the mutate operation consists of a Consolidate operation, wherein the action to perform on the node consists of a delete action, and wherein the number of elements stored in the node is less than one half of the capacity of the node.

28. The system as in claim 23, wherein the mutate operation consists of a NodeKill operation, wherein the action to perform on the node consists of a delete action to remove the node from the ordered tree data structure, and wherein the delete action deletes all elements stored in the node.

29. A non-transitory computer-readable medium with instructions stored therein, the instructions, when executed by one or more processors, cause the one or more processors to perform operations using one or more threads of execution to access a node in an ordered tree data structure for a hierarchical file system, the operations comprising:
  referencing a node in an ordered tree data structure of the hierarchical file system via an identifier for the node, the identifier stored in a path data structure separate from the ordered tree data structure;
  determining an operation to perform on the node, the operation to modify data in one or more nodes of the ordered tree data structure, wherein determining the operation to perform includes:
    determining a set of characteristics of node, the set of characteristics including the number of data elements stored in the node and the capacity of the node, and
    selecting an operation to perform on the node, the operation selected using constraints defined by factors including the ordered tree data structure used to store metadata for the file system, at least one characteristic in the set of characteristics of the node, and an action to perform on the node, wherein the action to perform on the node includes modifying file system metadata stored in the node.

30. The medium of claim 29, wherein selecting the operation to perform on the node includes selecting one of an Overwrite, Split, Consolidate, or NodeKill operation, wherein the NodeKill comprises removing a node from the ordered tree data structure.

31. A non-transitory computer-readable medium with instructions stored therein, the instructions, when executed by one or more processors, cause the one or more processors to perform operations to modify an ordered tree data structure of a hierarchical file system, the hierarchical file system to organize data on a storage device at the data processing system, the operations comprising:
  locking a first node in the ordered tree data structure for the hierarchical file system, wherein the ordered tree data structure stores metadata for the hierarchical file system;
  locking a second node in the ordered tree data structure;
  determining a set of operations to perform on the ordered tree data structure, the operations responsive to a modification of the second node;
  adding the set of operations to a path data structure separate from the ordered tree data structure; and
  performing the set of operations stored in the path data structure.

32. The medium as in claim 31, including additional instructions to perform further operations comprising:
  adding an identifier of the first node to the path data structure;
  searching the first node for an indicator to the second node;
  reading an identifier of the first node from the path data structure; and
  reading an identifier for the second node from the path data structure.

33. The medium as in claim 31, wherein determining the set of operations to perform on the ordered tree data structure includes determining an operation selected from a group of tree operations affecting one or more nodes, the operations comprising: Overwrite, Split, Consolidate, and NodeKill, wherein the NodeKill comprises removing a node from the ordered tree data structure.

* * * * *